US012617408B2

(12) United States Patent
Sartoni et al.

(10) Patent No.: US 12,617,408 B2
(45) Date of Patent: May 5, 2026

(54) MOTOR VEHICLE AND METHOD TO DETECT A PARAMETER ASSOCIATED WITH A SUPERFICIAL CONDITION OF THE ROAD SURFACE

(71) Applicant: FERRARI S.P.A., Modena (IT)

(72) Inventors: Giovanni Sartoni, Modena (IT); Matteo Montirosi, Modena (IT); Ugo Sitta, Modena (IT)

(73) Assignee: FERRARI S.P.A., Modena (IT)

( * ) Notice: Subject to any disclaimer, the term of this patent is extended or adjusted under 35 U.S.C. 154(b) by 244 days.

(21) Appl. No.: 18/493,261

(22) Filed: Oct. 24, 2023

(65) Prior Publication Data

US 2024/0140440 A1 May 2, 2024

(30) Foreign Application Priority Data

Oct. 31, 2022 (IT) ........................ 102022000022356

(51) Int. Cl.
B60W 40/06 (2012.01)
B60W 40/068 (2012.01)
(Continued)

(52) U.S. Cl.
CPC .......... B60W 40/06 (2013.01); B60W 40/068 (2013.01); B60W 40/13 (2013.01); G01J 1/44 (2013.01); G01S 7/4802 (2013.01); G01S 7/499 (2013.01); G01S 17/88 (2013.01); G01S 17/931 (2020.01); B60W 2420/40 (2013.01); B60W 2420/408 (2024.01); B60W 2530/10 (2013.01);
(Continued)

(58) Field of Classification Search
CPC ................. B60W 40/06; B60W 40/13; B60W 2420/408; B60W 2530/10; B60W 2555/20; B60W 2420/40; B60W 40/068; G01J 1/44; G01J 2001/442; G01J 2001/4466; G01S 7/499; G01S 17/88; G01S 17/931; G01S 7/4802
See application file for complete search history.

(56) References Cited

U.S. PATENT DOCUMENTS

| | | | |
|---|---|---|---|
| 2008/0129541 A1* | 6/2008 | Lu .......................... | G06V 20/56 |
| | | | 340/905 |
| 2016/0229252 A1* | 8/2016 | Lu ......................... | B60W 30/18 |

(Continued)

FOREIGN PATENT DOCUMENTS

| | | | |
|---|---|---|---|
| EP | 3428686 A1 | 1/2019 | |
| JP | H08193944 A | * 7/1996 | |

OTHER PUBLICATIONS

Italian Search Report for Application No. 102022000022356, Filing Date: Oct. 31, 2022; Date of Mailing: Apr. 25, 2023, 8 pages.

*Primary Examiner* — Jennifer D Bennett

(74) *Attorney, Agent, or Firm* — CANTOR COLBURN LLP

(57) ABSTRACT

A motor vehicle comprising a body defining a passenger compartment, a plurality of wheels; and a sensor designed to detect a parameter associated with a superficial condition of a road surface; the sensor comprises, in turn, an emitter configured to emit a first laser signal towards a road surface; and one or more single-photon avalanche diodes configured to detect a second laser signal corresponding to the reflection of the first laser signal against said road surface.

11 Claims, 4 Drawing Sheets

(51) Int. Cl.

| | |
|---|---|
| *B60W 40/13* | (2012.01) |
| *G01J 1/44* | (2006.01) |
| *G01S 7/48* | (2006.01) |
| *G01S 7/499* | (2006.01) |
| *G01S 17/88* | (2006.01) |
| *G01S 17/931* | (2020.01) |

(52) U.S. Cl.
CPC .... *B60W 2555/20* (2020.02); *G01J 2001/442* (2013.01); *G01J 2001/4466* (2013.01)

(56) References Cited

U.S. PATENT DOCUMENTS

| | | | |
|---|---|---|---|
| 2017/0176184 A1 | 6/2017 | Lee et al. | |
| 2017/0184399 A1* | 6/2017 | Thayer | ................... G01S 7/499 |
| 2021/0139090 A1 | 5/2021 | Shalit | |
| 2022/0283311 A1 | 9/2022 | Zhou et al. | |

\* cited by examiner

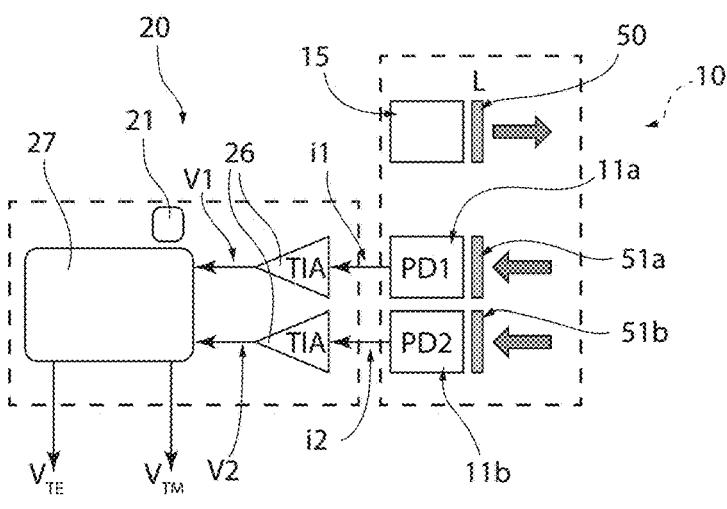
FIG. 2
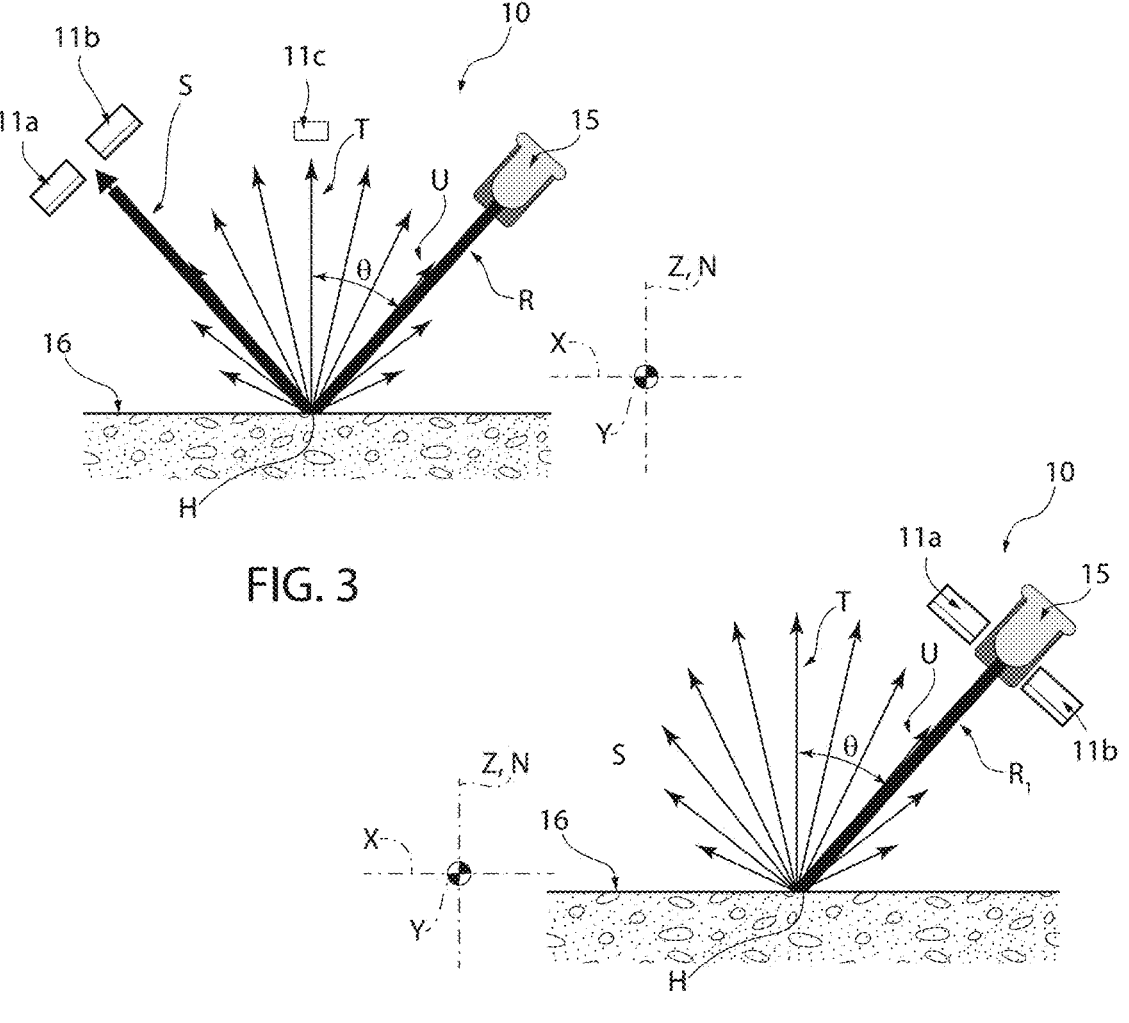
FIG. 3
FIG. 4

MOTOR VEHICLE AND METHOD TO DETECT A PARAMETER ASSOCIATED WITH A SUPERFICIAL CONDITION OF THE ROAD SURFACE

CROSS-REFERENCE TO RELATED APPLICATIONS

This patent application claims priority from Italian patent application no. 102022000022356 filed on Oct. 31, 2022, the entire disclosure of which is incorporated herein by reference.

TECHNICAL FIELD

The invention relates to a motor vehicle and to a method to detect a parameter associated with a superficial condition of the road surface.

More in particular, the superficial conditions of the road surface, for instance the presence of ice or of partially or completely wet asphalt, determine the grip of the tyres on the road surface and significantly affect driving safety.

BACKGROUND

Motor vehicles are known, which comprise systems capable of estimating the grip of the tyres on the road surface.

Said systems comprise, in a known manner:

one or more capacitive, piezoelectric or optical sensors capable of adopting temperature and/or humidity measures in an area surrounding the road surface on which the motor vehicle travels; and a control unit programmed to process said measures, to estimate a value of the coefficient of grip of the tyres on the road surface and to identify the consequent condition of potential danger based on the signals.

In known solutions, the grip coefficient is estimated only at particularly high travel speeds of the motor vehicle, close to the grip limit.

Consequently, when the travel speed is low, the aforesaid systems risk detecting the condition of potential danger too late or in a way that is not consistent with the actual grip conditions of the road surface.

In the automotive industry, the conditions of the road surface need to be detected in a correct and prompt manner even when the motor vehicle travels at low speeds or when the motor vehicle is parked, so as to increase the degree of safety of the motor vehicle.

SUMMARY

The aforesaid object is reached by the invention, as it relates to a motor vehicle as defined in claim 1.

The invention also relates to a method to detect a parameter associated with a superficial condition of the road surface as set forth in claim 8.

BRIEF DESCRIPTION OF THE DRAWINGS

The invention will be best understood upon perusal of the following detailed description of a preferred embodiment, which is provided by way of non-limiting example, with reference to the accompanying drawings, wherein:

FIG. 2 is a functional diagram of a sensor and of a control unit incorporated in the motor vehicle 1, with parts removed for greater clarity;

FIG. 3 schematically shows a first embodiment of the sensor of FIG. 1, with parts removed for greater clarity;

FIG. 4 schematically shows a second embodiment of the sensor of FIG. 1, with parts removed for greater clarity;

DESCRIPTION OF EMBODIMENTS

Figure 1:
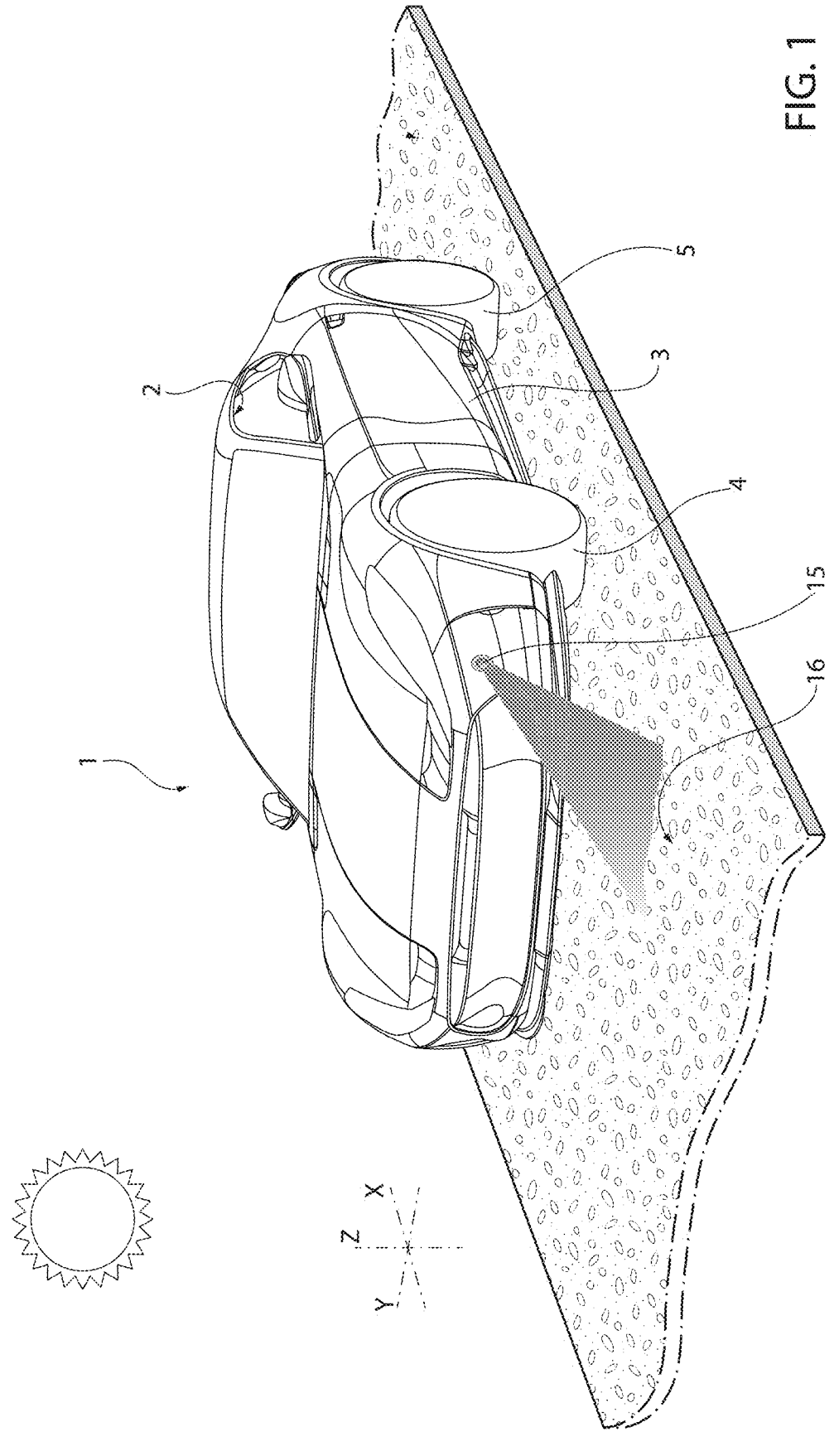
FIG. 1 is a perspective view of a motor vehicle according to the invention.

With reference to the accompanying Figures, number 1 indicates a motor vehicle comprising a body 2 defining a passenger compartment 3 and a plurality of wheels 4, 5.

In particular, the motor vehicle 1 comprises, in a known manner, a sprung mass comprising the body 2 and an unsprung mass comprising the wheels 4, 5 and elastically connected to the sprung mass through the suspensions.

Hereinafter, expressions such as "at the top", "at the bottom", "at the front", "at the back" and others similar to them are used with reference to normal travel conditions of the motor vehicle 1.

Furthermore, it is possible to define:

a longitudinal axis X integral to the motor vehicle 1, which, in use, is horizontal and parallel to a normal driving direction of the motor vehicle 1;

a transverse axis X integral to the vehicle 1, which, in use, is horizontal and orthogonal to the axis X; and an axis Z integral to the vehicle 1, which, in use, is vertical and orthogonal to the axes X, Y.

The motor vehicle 1 further comprises a sensor 10 designed to detect a parameter associated with an operating condition of the motor vehicle 1.

In the specific case shown herein, the sensor 10 is an optical sensor.

The operating condition is a condition representative of the condition of a road surface 16 and/or the individual travel speed of each wheel 4, 5.

In particular, the expression "condition representative of the condition of the road surface" indicates, for example, a condition of partially wet, completely wet, snow-covered or icy road surface 16.

The sensor 10 advantageously comprises:

an emitter 15 configured to emit a laser signal R; and one or more single-photon avalanche diodes 11a, 11b; 11c (also known as SPADs) configured to receive a laser signal S, T; U reflected by the road surface 16 through mirror-like reflection or through diffuse radiation.

More in detail, the sensor 10 and the emitter 15 are both mounted on the body 3.

The emitter 15 is configured so as to emit a laser signal R towards a road surface 16 (FIGS. 3 and 4).

Following the interaction with the road surface 16, the laser signal R is reflected as:

the laser signal S through mirror-like reflection or Fresnel reflection; and a plurality of laser beams T, U through reflection by diffuse radiation.

The term "diffuse radiation" indicates the diffusion of the laser signal R incident on the road surface 16 in a plurality of directions.

More precisely, the laser signals R, S propagate on respective opposite sides relative to a direction N normal to the road surface 16 in the point of incidence of the signal R with the road surface 16.

The laser signals R, S define a same angle θ with the normal N.

In particular the normal direction N is parallel to the axis Z.

The laser signal U is parallel to the normal direction N.

The laser signals R, T propagate on respective opposite sides relative to the direction N and define a same angle θ with the direction N.

In other words, the laser signal T corresponds to the return diffuse radiation, namely to the component of the reflection by diffuse radiation reflected parallel to the laser signal R.

In particular, the laser signals R, S, T are pulsed signals.

The single-photon avalanche diodes 11a, 11b are configured so as to receive the laser beams S, T, as described more in detail below.

More in particular, the single-photon avalanche diodes 11a, 11b and the emitter 15 aim in the direction of the road surface 16, namely face the road surface 16 without the interposition of surfaces opaque to laser radiations.

In particular, the emitter 15 is configured so as to emit the laser beam R towards a front area relative to the instantaneous position of the motor vehicle 1.

Figure 7:
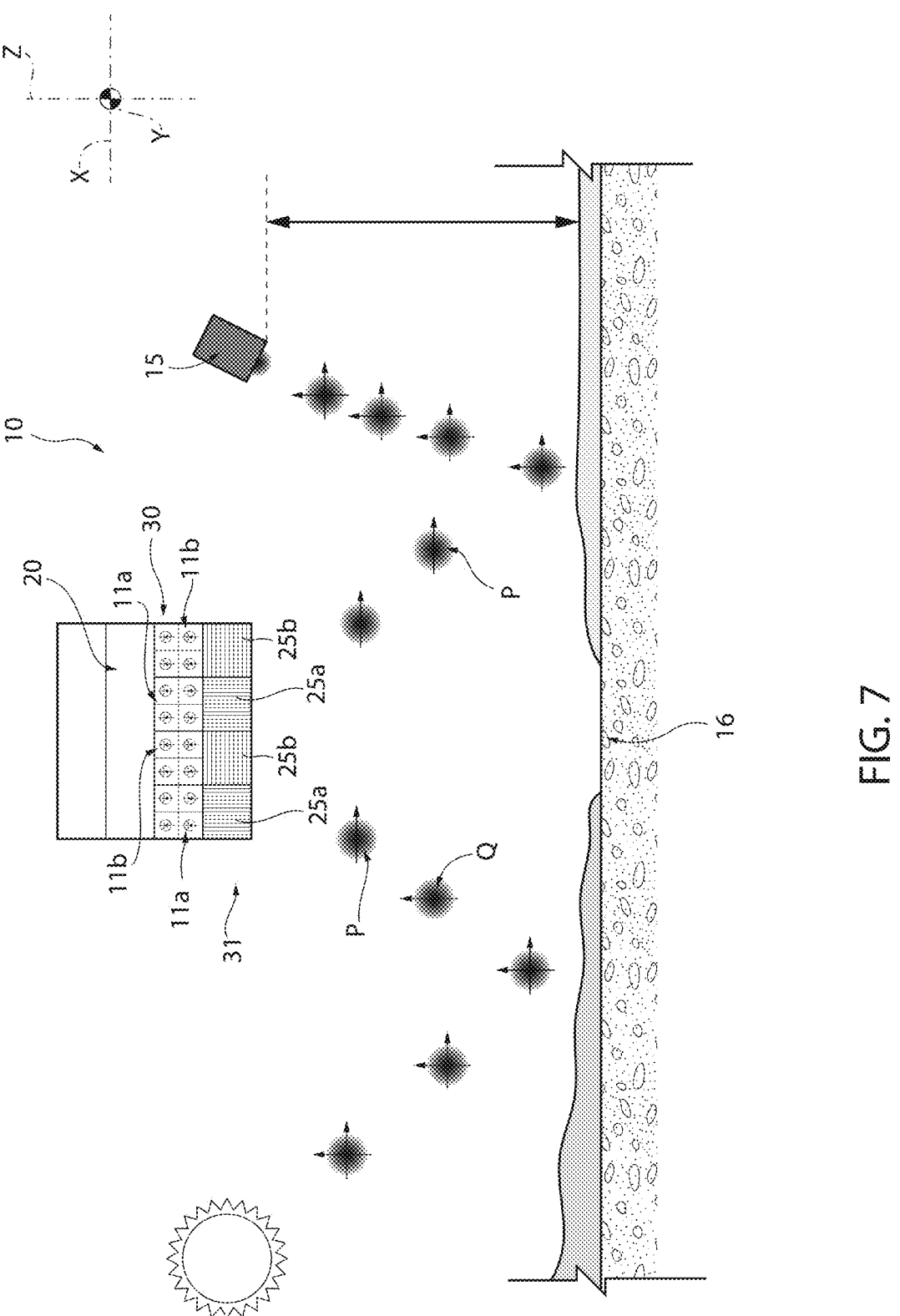
FIG. 7 schematically shows, on a much larger scale, further components of the sensor of FIGS. 2 to 6.

Following the reflection against the road surface 16, the laser signal S, T is polarised in a plane P and in a plane Q (FIG. 7).

The laser signal U corresponds to the non-polarised component reflected through diffuse radiation by the road surface 16.

The plane P is parallel to the road surface 16 and, hence, parallel to the axes X, Y.

The plane Q is perpendicular to the road surface 16 and, hence, orthogonal to the plane P and parallel to the axes X, Y.

The laser signal S, T has an intensity ITM in the plane P and ITE in the plane Q.

The intensities ITM and ITE depend on the conditions of the road surface 16, namely on the fact that the road surface 16 is partially wet, completely wet, snow-covered or icy.

The sensor 10, in particular, is designed to detect the condition of the road surface 16 based on the intensity and on the polarisation of the laser signals S, T, U.

The motor vehicle 1 further comprises a control unit 20 (FIG. 2) operatively connected to the single-photon avalanche diodes 11a, 11b and programmed to process the parameter associated with a superficial condition of said road surface 16, based on the intensities ITM, ITE of the laser signal S, T.

Furthermore, the motor vehicle 1 further comprises (FIG. 7) a plurality of polariser filters 25a, 25b configured to be hit by the laser signal S, T.

The single-photon avalanche diodes 11a, 11b are associated with respective polariser filters 25a, 25b and are designed to be hit by the laser signal S, T filtered by the respective polariser filters 25a, 25b.

More in detail, the polariser filters 25a, 25b allow for the passage of respective components of the laser signal S, T polarised in respective planes P, Q.

The single-photon avalanche diodes 11a, 11b associated with the polariser filters 25a, 25b detect the number of photons of the components of the laser signal S, T polarised in respective planes P, Q, namely the value of the intensities ITE, ITM, and generate respective currents i1, i2 (FIG. 2) associated with said intensities ITE, ITM.

Each polariser filter 25a, 25b is optically interposed between the road surface 16 and the relative single-photon avalanche diode 11a, 11b.

The polariser filters 25a, 25b form a structure 30 and the single-photon avalanche diodes 11a, 11b form a structure 31.

The structures 30, 31 extend parallel to the axis X and overlap one another parallel to the axis Z.

The structure 30 is optically interposed between the road surface 16 and the structure 31.

In a first embodiment, the single-photon avalanche diodes 11a, 11b detect the signal S reflected through mirror-like reflection, namely through Fresnel reflection.

In said first embodiment, which is shown in FIG. 3, the single-photon avalanche diodes 11a, 11b are arranged on respective opposite sides relative to the axis Z, which is parallel to a normal N to the road surface 16.

By so doing, the single-photon avalanche diodes 11a, 11b create a configuration known in the industry as θ-2θ configuration.

In the first embodiment of FIG. 3, the single-photon avalanche diode 11c is not associated with any polariser filter 25a, 25b and detects the laser signal U.

The single-photon avalanche diode 11c aims, in the specific case shown herein, in a direction parallel to the direction N.

In a second embodiment, the single-photon avalanche diodes 11a, 11b detect the signal T reflected through return diffuse reflection.

In said second embodiment shown in FIG. 4, the single-photon avalanche diodes 11a, 11b are arranged on the same side relative to the normal N.

The laser beams R, T define a same angle θ with the normal N in a point of incidence H of the laser beam R on the road surface 16.

By so doing, the single-photon avalanche diodes 11a, 11b create a configuration known in the industry as backscatter configuration.

In the second embodiment, the single-photon avalanche diode 11c could be absent.

The control unit 20 is programmed to:

acquire, from the sensor 10, the intensity values ITE, ITM in the respective planes P, Q;

receive, from the single-photon avalanche diode 11c, a signal SC associated with the intensity of the non-polarised component of the laser signal U reflected by the road surface 16 through diffuse radiation;

process a polarisation contrast value equal to $$\frac{ITE - ITM}{ITE + ITM},$$

also based on the intensity values ITE, ITM and SC; and process the parameter associated with the condition of partially wet, completely wet, completely wet, snow-covered or icy road surface 16.

Figure 6:
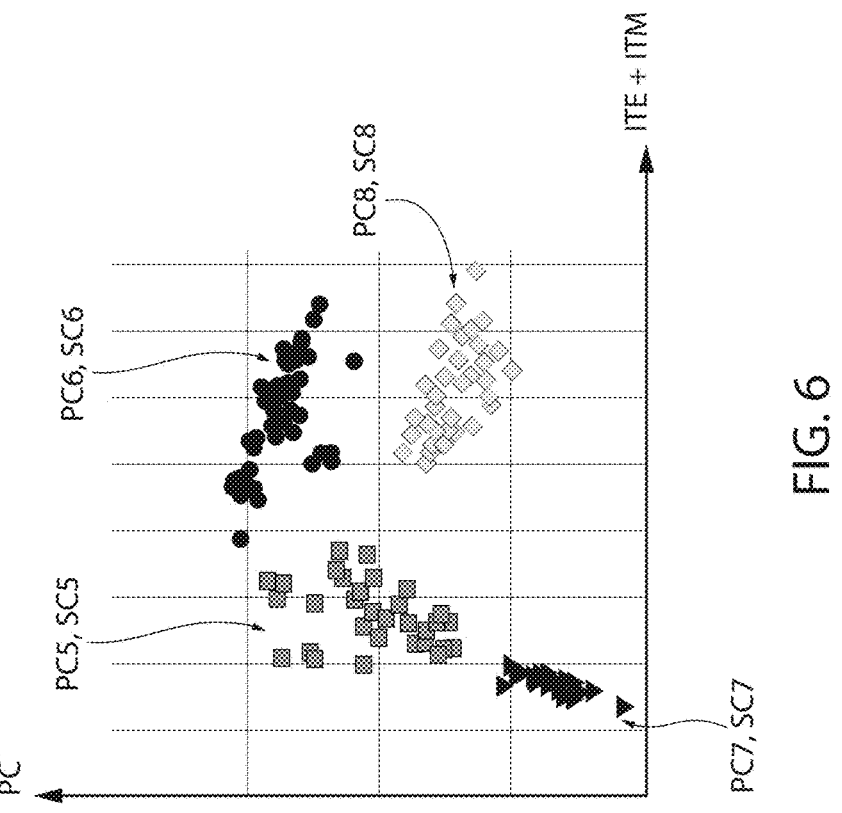
FIGS. 5 and 6 graphically show the values of respective tables stored in the control unit of the sensor of FIGS. 1 to 4.
Figure 5:
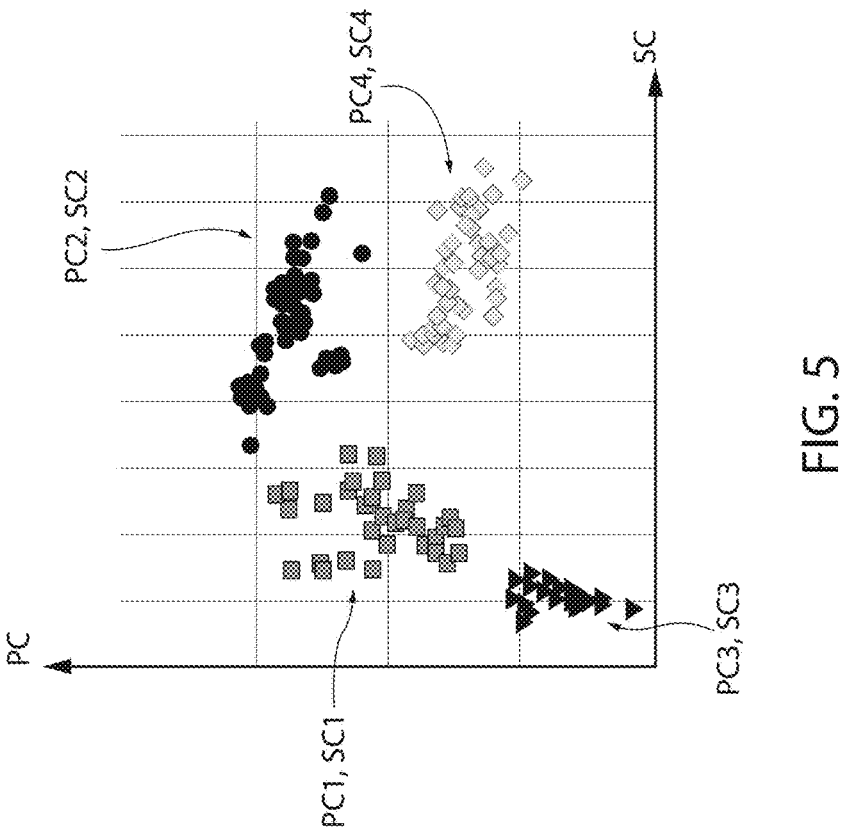

With particular reference to FIG. 5, the control unit 20 comprises a storing stage 21, which stores:

an interval PC1 of polarisation contrast values PC associated with an interval SC1 of total intensity values SC of the non-polarised laser signal U, which are representative of the condition of dry road surface 16;

an interval PC2 of polarisation contrast values PC associated with an interval SC2 of intensity values SC of the non-polarised laser signal U, which are representative of the condition of partially wet road surface 16;

an interval PC3 of polarisation contrast values PC associated with an interval SC3 of intensity values SC of the non-polarised laser signal U, which are representative of the condition of completely wet road surface 16; and an interval PC4 of polarisation contrast values PC associated with an interval SC4 of intensity values SC of the non-polarised laser signal U, which are representative of the condition of icy road surface 16;

The storing stage 21 further stores (FIG. 6):

an interval PC5 of polarisation contrast values PC associated with an interval SC5 of values of the sum of the intensities ITE, ITM in the respective planes P, Q, which are representative of the condition of dry road surface 16;

an interval PC6 of polarisation contrast values PC associated with an interval SC6 of values of the sum of the intensities ITE, ITM in the respective planes P, Q, which are representative of the condition of partially wet road surface 16;

an interval PC7 of polarisation contrast values PC associated with an interval SC7 of values of the sum of the intensities ITE, ITM in the respective planes P, Q, which are representative of the condition of completely wet road surface 16;

an interval PC8 of polarisation contrast values PC associated with an interval SC8 of values of the sum of the intensities ITE, ITM in the respective planes P, Q, which are representative of the condition of icy road surface 16.

The storing stage 21 further stores:

an interval PC9 of polarisation contrast values PC associated with an interval θ1 of values of the angle θ between the laser signal R emitted by the emitter 15 and the road surface 16, which are representative of the condition of dry road surface 16;

an interval PC10 of polarisation contrast values PC associated with an interval θ2 of values of the angle θ between the laser signal R emitted by the emitter 15 and the road surface 16, which are representative of the condition of partially wet road surface 16;

an interval PC11 of polarisation contrast values PC associated with an interval θ3 of values of the angle θ between the laser signal R emitted by the emitter 15 and the road surface 16, which are representative of the condition of completely wet road surface 16; and an interval PC12 of polarisation contrast values PC associated with an interval θ4 of values of the angle θ between the laser signal R emitted by the emitter 15 and the road surface 16, which are representative of the condition of icy road surface 16.

The intervals PC9, PC10, PC11, PC12; θ1, θ2, θ3, θ4 are not shown in the accompanying Figures.

In the second embodiment, the intervals PC1, PC2, PC3, PC4 of the polarisation contrast PC and the respective intervals SC1, SC2, SC3, SC4 of the intensity SC of the non-polarised laser signal U could be absent.

In the specific case shown herein, the motor vehicle 1 comprises (FIG. 2):

an optical system 50, for example a first collimator lens, optically coupled, for example at the front, to the emitter 15; and a plurality of optical systems 51a, 51b, for example respective second lenses, optically coupled, for example at the front, to the corresponding single-photon avalanche diodes 11a, 11b.

The control unit 20 further comprises:

a pair of current-voltage converters 26, in the specific case shown herein transimpedance amplifiers, designed to convert respective current signals i1, i2 generated by the single-photon avalanche diodes 11a, 11b into corresponding voltage signals V1, V2; and an amplifier 27 designed to amplify the aforesaid input voltage signals V1, V1 into respective output voltage signals VTE, VTM associated with relative intensities ITE, ITM.

Each single-photon avalanche diode 11a, 11b, 11c is preferably manufactured in the form of a SPAD/CMOS chip. In this way, the single-photon avalanche diode 11a, 11b, 11c manages to read the information emitted by the emitter 15 at a very high speed.

In the specific case shown herein, the emitter 15 is a VCSEL (Vertical Cavity Surface Emitting Laser) source, namely is a surface emitting laser source with a vertical cavity.

In use, the emitter 15 emits the laser signal R directed towards the road surface 16 (FIGS. 3 and 4).

The road surface 16 reflects the laser signal R through mirror-like radiation, thus forming the laser signal S, and through diffuse radiation, thus forming the laser beams T, U.

The laser beams S, T are polarised in the planes P, Q.

The intensities ITE, ITM of the laser signal S, T in the planes P, Q depend on the conditions of the road surface 16, in particular on the fact that it is partially wet, completely wet, snow-covered or icy.

In the first embodiment, the laser signal S, at first, goes through the polariser filters 25a, 25b and, subsequently, goes through the respective single-photon avalanche diodes 11a, 11b (FIG. 3).

The single-photon avalanche diodes 11a, 11b detect the number of photons of the components of the laser signal S polarised in respective planes P, Q, namely the value of the intensities ITE, ITM, and generate respective currents i1, i2 with a corresponding intensity.

In the first embodiment, the single-photon avalanche diode 11c detects the number of photons of the non-polarised component U and generates the signal SC associated with the intensity of the non-polarised laser signal S reflected by the road surface 16 through diffuse radiation.

In the second embodiment, the laser signal T diffused parallel to the laser signal R, at first, goes through the polariser filters 25a, 25b and, subsequently, goes through the respective single-photon avalanche diodes 11a, 11b (FIG. 4).

Similarly to the first embodiment, the single-photon avalanche diodes 11a, 11b detect the number of photons of the components of the laser signal T polarised in respective planes P, Q, namely the value of the intensities ITE, ITM, and generate respective currents i1, i2 with a corresponding intensity.

In both embodiments, the control unit 20 acquires, from the sensor 10, the intensity values ITE, ITM in the respective planes P, Q; processes a polarisation contrast value PC equal to $$\frac{ITE - ITM}{ITE + ITM};$$

and processes the parameter associated with the condition of partially wet, completely wet, completely wet, snow-covered or icy road surface 16.

More in particular, the converters 26 turn the currents i1, i2 generated by the single-photon avalanche diodes 11*a*, 11*b* into respective voltages V1, V2 and the amplifier 27 amplifies said voltages V1, V2 into respective signals VTE, VTM associated with corresponding intensities ITE, ITM (FIG. 2).

The control unit 20 compares the interval of polarisation contrast values PC1, PC2, PC3, PC4, PC5, PC6, PC7, PC8, PC9, PC10, PC11, PC12 comprising the processed value of the polarisation contrast PC with:

the values SC1, SC2, SC3, SC4 of the total intensity of the non-polarised laser signal U;

the values SC5, SC6, SC7, SC8 of the sum of the intensities ITE, ITM in the planes P, Q contained in the storing stage 21; and/or the value of the angle θ between the laser signal R emitted by the emitter 15 and the road surface 16.

Following this comparison, the control unit 20 consequently identifies a condition of dry, partially wet, completely wet or icy road surface 16.

For example, the control unit 20 processes a condition of icy road surface 16 in case the polarisation contrast value PC is comprised in the interval of values OC4 and/or the intensity SC of the non-polarised laser signal R is comprised in the values SC4 and/or the angle θ is comprised in the interval of values θ4.

In the second embodiment, the control unit 20 compares the interval of polarisation contrast values PC5, PC6, PC7, PC8, PC9, PC10, PC11, PC12 comprising the polarisation contrast value PC with:

the values SC5, SC6, SC7, SC8 of the sum of the intensities ITE, ITM in the planes P, Q contained in the storing stage 21; and/or the value of the angle θ between the laser signal R emitted by the emitter 15 and the road surface 16.

Following this comparison, the control unit 20 consequently identifies a condition of partially wet, completely wet, snow-covered or icy road surface 16.

The disclosure above reveals evident advantages that can be obtained with the invention.

In particular, the emitter 15 emits the laser signal R towards the road surface 16 and the single-photon avalanche diodes 11*a*, 11*b*, 11*c* detect the laser signal S, T, U reflected by the road surface 16.

Since the intensity and polarisation properties of the reflected laser signals S, T, U depend on the conditions of the road surface 16, the condition of the road surface 16 can be detected in a precise and prompt manner, with evident advantages in terms of driving safety of the motor vehicle 1, even at low speeds or when the motor vehicle 1 is parked.

The sensor 10 comprises a plurality of polariser filters 25*a*, 25*b* designed to filter the first and the second component of the laser signals S, U polarised in the planes P, Q, respectively, and to make them available to the single-photon avalanche diodes 11*a*, 11*b*, respectively.

In this way, the single-photon avalanche diodes 11*a*, 11*b* supply the control unit 20 with electric currents i1, i2 associated with the intensities ITE, ITM and, hence, depending on the conditions of the road surface 16.

By so doing, the control unit 20 can process the polarisation contrast value PC based on the intensities ITE, ITN and identify the condition of the road surface 16 by comparing the polarisation contrast PC with the values of the intensity SC of the non-polarised laser beam T and/or with the values of the angle θ and/or with the values of the sum of the intensities ITM, ITE.

In the first embodiment, the single-photon avalanche diodes 11*a*, 11*b* detect the laser signal S reflected through mirror-like reflection. By so doing, the value of the intensities ITM, ITE detected by the single-photon avalanche diodes 11*a*, 11*b* can be maximized.

In the second embodiment, the single-photon avalanche diodes 11*a*, 11*b* detect the laser signal T reflected by the road surface 16 through return diffuse radiation and are arranged on the same side of the normal N.

By so doing, the dimensions of the sensor 10 are minimized.

In addition, in the second embodiment, the sensor 10 does not need the single-photon avalanche diode 11*c*, in case the control unit 20 compares the polarisation contrast PC with the angle θ and/or with the sum of the intensities ITE and ITM.

Finally, the motor vehicle 1 and the method according to the invention can be subjected to changes and variations, which, though, do not go beyond the scope of protection set forth in the appended claims.

The invention claimed is:

1. A motor vehicle (1) comprising:

a body (2) defining a passenger compartment (3);

a plurality of wheels (4, 5); and a sensor (10) designed to detect a parameter associated with a superficial condition of a road surface (16);

said sensor (10) comprising, in turn:

an emitter (15) configured to emit a first laser signal (R) towards the road surface (16);

a plurality of single-photon avalanche diodes (SPADs) (11*a*, 11*b*, 11*c*) configured to detect second laser signals (S, T, U) corresponding, in use, to a reflections of the first laser signal (R) against said road surface (16), wherein said second laser signals (S, T, U) comprise both a specularly reflected component and a diffusely reflected component from the road surface (16); and a control unit (20) comprising a microprocessor programmed to process the parameter (PC) indicative of the superficial condition of said road surface (16), based on an intensities of said second laser signals (S, T, U), said intensities being determined by a number of photons detected, in use, by said plurality of SPADs (11*a*, 11*b*, 11*c*);

said parameter being indicative of the superficial condition selected from a group consisting of a dry, a partially wet, a completely wet, or an icy road surface (16);

wherein said sensor (10) further comprises:

a plurality of polariser filters (25*a*, 25*b*) configured to be hit by selected ones of the second laser signals (S, T, U) determined by the reflections of said first laser signal (R) on said road surface (16), each of the reflections are optically aligned with a respective one of the plurality of SPADs (11*a*, 11*b*), configured to receive the second laser signals (S, T, U) reflected from the road surface (16); wherein said second laser signals (S, T, U) comprise a first component polarised in a first plane (P) and a second component polarised in a second plane (Q); and wherein the plurality of SPADs (11*a*, 11*b*, 11*c*) comprise a plurality of first SPADs (11*a*, 11*b*) arranged in sequence relative to said polariser filters (25*a*, 25*b*) and associated with respective polariser filters of said plurality of polarizer filters (25*a*, 25*b*), so as to detect said first or second polarised component; and a second SPAD (11*c*) not associated with any polariser filter and arranged with an optical axis substantially coincident with a normal (N) direction to said road surface (16), said second SPAD (11*c*) being configured to detect a third, non-polarised component of said second laser signals (S, T, U) generated, in use, through the diffuse reflection of said first laser signal (R) on said road surface (16);

wherein said control unit (20) is programmed to process said parameter (PC) indicative of said superficial condition of said road surface (16), based on a first intensity (ITM) of said first component and on a second intensity (ITE) of said second component, wherein said first intensity (ITM) and said second intensity (ITE) are determined by photon-counting measurements performed by a respective one of the plurality of first SPADs (11a, 11b);

said first plane (P) being, in use, parallel to said road surface (16) and said second plane (Q) being, in use, orthogonal to said road surface (16).

2. The motor vehicle according to claim 1, wherein the emitter (16) is configured to emit said first laser signal (R) along a direction defining, in use, an angle (θ) with the normal (N) direction to said road surface (16) in a point of incidence (H) of said first laser signal (R) on said road surface (16).

3. The motor vehicle according to claim 2, wherein the plurality of first SPADs (11a, 11b) are configured to detect said second signals(S) along a direction defining, in use, the same angle (θ) with said normal (N) direction;

said emitter (16) and said plurality of first SPADs (11a, 11b) being symmetrically arranged on opposite sides of said normal (N);

said second signals(S) being generated, in use, through the specular reflection of said first signal (R) on said road surface (16).

4. The motor vehicle according to claim 2, wherein said emitter (16) and said plurality of first SPADs (11a, 11b) are arranged on the same side of said normal (N) direction;

said selected ones of the second laser signals (S, T, U) being generated, in use, by the diffuse reflection of said first signal (R) on said road surface (16).

5. The motor vehicle according to claim 1, wherein said control unit (20) is programmed to process a polarisation contrast value (PC) equal to $$\frac{ITE - ITM}{ITE + ITM},$$

wherein ITE is the intensity of said second component (ITE) and ITM is the intensity of said first component (ITM);

said control unit (20) being programmed to:

acquire a first value of said angle (θ) and/or a second value associated with the sum of said first and second component (ITE, ITM) and/or a third value associated with said intensity (SC) of said third non-polarised laser signal (T);

compare said value of said polarisation contrast (PC) with at least one or a range of said first, second and third value; and process said parameter based on said comparison.

6. The motor vehicle according to claim 1, wherein the motor vehicle comprises:

a sprung mass comprising said body (2); and an unsprung mass comprising said wheels (4, 5) and elastically connected to said sprung mass.

7. A method to detect a parameter associated with a superficial condition of a road surface (16), comprising:

detecting the parameter associated with the superficial condition of the road surface (16) with a sensor (10) by:

i) emitting a first laser signal (R);

ii) reflecting said first laser signal (R) onto said road surface (16) to generate second laser signals (S, T, U), wherein said second laser signals (S, T, U) comprise both a specularly reflected component and a diffusely reflected component from the road surface (16), and wherein said second laser signals (S, T, U) comprise a first component polarised in a first plane (P), a second component polarised in a second plane (Q), and a third non-polarized component;

iii) detecting said second laser signals (S, T, U) by means of a plurality of single-photon avalanche diodes (SPADs) (11a, 11b, 11c) configured to detect the second laser signals (S, T, U);

iv) processing the parameter (SC) associated with the superficial condition of said road surface (16), based on intensities of said second laser signals (S, T, U); said intensities being associated with a number of photons detected, in use, by said plurality of SPADs (11a, 11b, 11c), wherein the plurality of SPADs comprises a plurality of first SPADs (11a, 11b) and a second SPAD (11c), wherein the plurality of first SPADs are arranged in sequence relative to polariser filters (25a, 25b) for detecting the first component polarised in the first plane (P) and the second component polarised in the second plane (Q), and wherein the second SPAD (11c) is not associated with any polariser filter and is arranged with an optical axis substantially coincident with a normal (N) direction to said road surface (16) for detecting the third non-polarized component;

said parameter being associated with said superficial condition selected from a group consisting of a dry, a partially wet, a completely wet, or an icy road surface (16);

v) filtering, by means of a plurality of polariser filters (25a, 25b), said second laser signals (S, T, U) determined by the reflection of said first laser signal (R) on said road surface (16); said reflected second laser signals (S, T, U) comprising the first component polarised in a first plane (P), the second component polarised in a second plane (Q), and the third non-polarised component; and vi) detecting, by means of the plurality of first SPADs (11a, 11b) said first or second polarised component and/or detecting by means of the plurality of second SPAD (11c) the third, non-polarised component; and vii) processing said parameter associated with said superficial condition of said road surface (16), based on a first intensity (ITM) of said first component and on a second intensity (ITE) of said second component, and/or by an intensity of the third, non-polarised component;

said first plane (P) being, in use, parallel to said road surface (16), said second plane (Q) being, in use, orthogonal to said road surface (16), and said third non-polarised component being at the normal (N) direction to the road surface (16).

8. The method according to claim 7, wherein detecting said second laser signals (S, T, U) comprises detecting specular reflection from said road surface (16); and/or through diffuse radiation returning from said road surface (16).

9. The method according to claim 8, wherein detecting the third, non-polarised component comprises detecting an intensity (SC) of a third non-polarised laser signal (T) generated, in use, through the diffuse radiation of said first laser signal (R) on said road surface (16).

10. The method according to claim 9, further comprising processing a polarisation contrast value (PC) equal to $$\frac{ITE - ITM}{ITE + ITM},$$

wherein ITE is the intensity of said second component (ITE) and ITM is the intensity of said first component (ITM);

acquiring a first value of an angle (θ) of incidence of said first laser signal (R) on said road surface (16) and/or a second value associated with the sum of said first and second component (ITE, ITM) and/or a third value associated with said intensity (SC) of said third non-polarised laser signal (T);

comparing said value of said polarisation contrast (PC) with at least one or a range of said first, second and third value; and processing said parameter based on said comparison.

11. A computer product including a non-transitory readable medium loaded onto and executed by a control unit (20) and designed, when the computer product is executed, to implement the steps of the method according to claim 7.

* * * * *